United States Patent [19]

Harding

[11] 4,398,737
[45] Aug. 16, 1983

[54] TRANSPORT DEVICE FOR WHEELLESS POWER DRIVEN EQUIPMENT

[75] Inventor: Edward M. Harding, Middletown, Md.

[73] Assignee: Equipment Development Company, Frederick, Md.

[21] Appl. No.: 224,809

[22] Filed: Jan. 13, 1981

[51] Int. Cl.³ .............................................. B62B 3/02
[52] U.S. Cl. ............................... 280/47.13 R; 51/177; 280/47.17; 280/767
[58] Field of Search ...................... 280/47.13 R, 47.15, 280/47.1, 47.32, 47.12, 43.19, 47.17, 43.1, 767, 46, 47; 248/129; 414/457; 15/49 R, 50 R; 51/177

[56] References Cited

U.S. PATENT DOCUMENTS

| | | | |
|---|---|---|---|
| 1,692,135 | 11/1928 | Millen | 280/43.1 |
| 2,142,697 | 1/1939 | Myers | 51/177 X |
| 2,153,481 | 4/1939 | Ponselle | 51/177 X |
| 3,271,798 | 9/1966 | Zoretic | 280/47.32 X |
| 3,462,781 | 8/1969 | Olvera | 280/47.13 B X |

Primary Examiner—David M. Mitchell
Assistant Examiner—Michael Mar
Attorney, Agent, or Firm—Birch, Stewart, Kolasch & Birch

[57] ABSTRACT

A detachable wheeled dolly or hybrid roller skate device for separable connection to the base portion and the handle of relatively large and heavy wheelless power driven handle manipulated machines is disclosed whereby an upward push on lifting the handle tilts the machine from out of surface contact and allows the roller skate device to swing under the machine. A subsequent lowering of the machine allows the roller skate device to support the machine, whereby a downward push on the handle tilts the machine out of surface contact and facilitates transport of the machine from one location to another as required. The centroid or center of mass of the hybrid roller skate device is located so that the roller skate device will swing under the machine to be supported.

4 Claims, 5 Drawing Figures

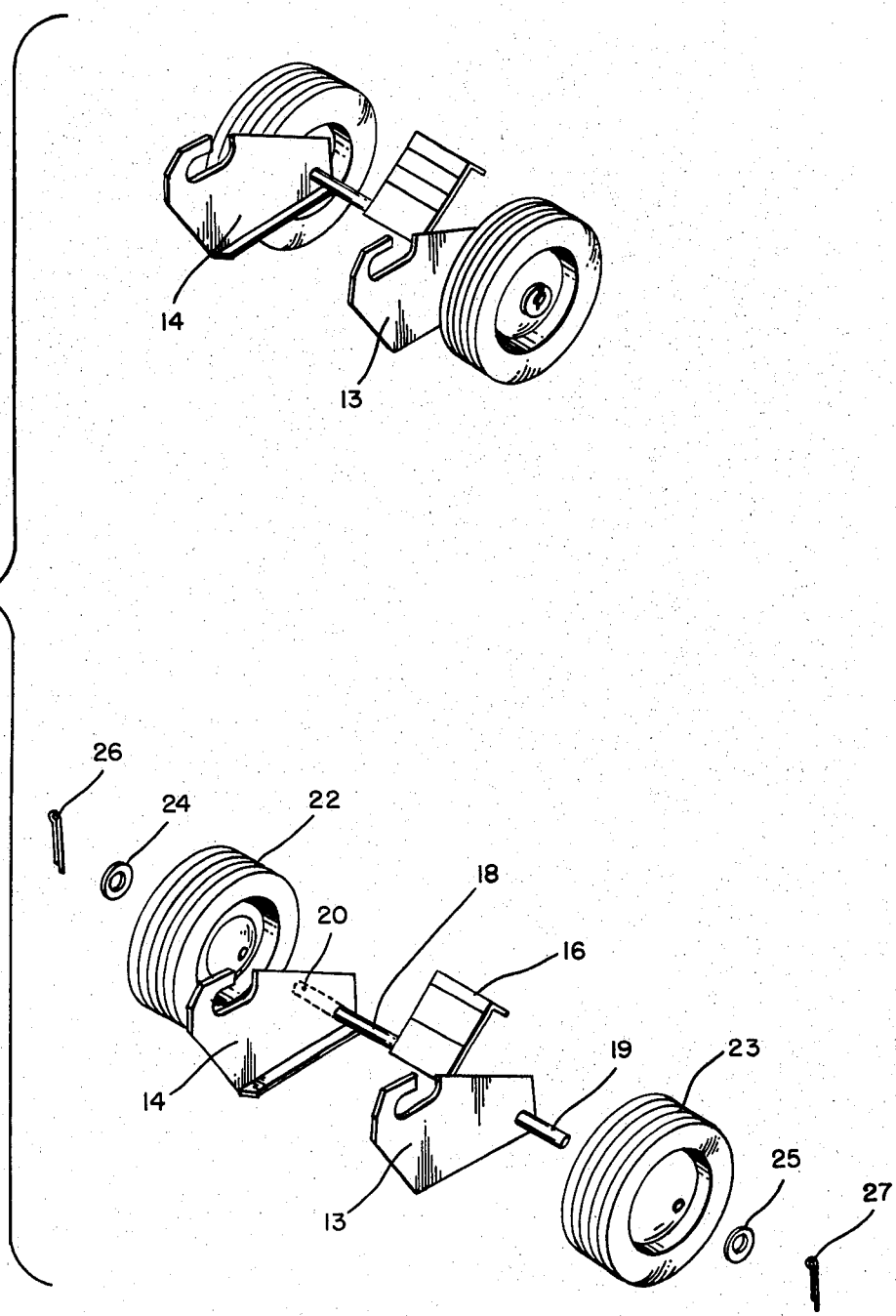

TRANSPORT DEVICE FOR WHEELLESS POWER DRIVEN EQUIPMENT

BACKGROUND OF THE INVENTION

1. Field of the Invention

Generally this invention relates to a readily connectible and detachable dolly or hybrid roller skate having wheel or roller means to permit transport of wheelless power driven surface treating trowels, sanders and the like in the provision of an auxiliary wheel or roller arrangement for transport of heavy power machines and the like.

2. Description of the Prior Art

The prior art has for many years been concerned with the problems attendant to the efficient and simple requirement to provide the maneuverability of heavy wheelless machines from one work location to another and to provide an auxiliary wheel device to facilitate transport of such machines to desired areas.

For example, prior patents have been issued for wheeled transport devices devised to selectably connect and disconnect from heavy equipment when deemed necessary to provide for transport thereof.

The following are examples of some of such prior patents:

U.S. Pat. No. 518,462, Loomis, Apr. 17, 1894
U.S. Pat. No. 760,708, Sharp, May 24, 1904
U.S. Pat. No. 1,025,767 Waterman, May 7, 1912
U.S. Pat. No. 1,120,938, Hazard, Dec. 15, 1914
U.S. Pat. No. 2,089,336, Brown, Aug. 10, 1937
U.S. Pat. No. 2,439,581, Robins, Apr. 13, 1948
U.S. Pat. No. 2,479,421, Sempe, Aug. 16, 1949
U.S. Pat. No. 3,134,375, Schurra, May 26, 1964
U.S. Pat. No. 3,150,734, Duggar, Jr., Sept. 29, 1964
U.S. Pat. No. 3,190,674, Carter, June 22, 1965

However, the prior art has not provided a transport device of relatively roller skate size convertible into wheeled transport dolly formation when it is attached and adjustably mounted to the base of a relatively heavy wheelless surface treating machine whereby the machine may be manually tilted from contact with such machine supporting surface when tilted by a downward manual push on the machine handle and be manually pushed around by the machine handle in wheeled transport dolly fashion.

SUMMARY OF THE INVENTION

The main object of the present invention is the provision of a relatively small hybrid roller skate to provide in effect an auxiliary wheeled transport dolly or the like formed to connect with the base of a relatively heavy wheelless surface smoothing machine, whereby the rollers or wheels of the dolly will serve to permit rolling transport of the heavy machine to different locations.

Another object is to provide a miniature dolly or roller skate-like attachment for transport of a handle maneuvered wheelless power driven machine, such as a surface smoother, sander and the like.

Yet another object is to provide a simpler roller skate or wheeled dolly adapted to be packaged and shipped disassembled in a knockdown state, to thereby be subsequently assembled and attached to many types of wheelless power operated surface treating machines to effect easy rolling movement of such machines when mounted and moved on the dolly rollers or wheels to different locations.

The foregoing and other objects and advantages of the present invention will appear more fully hereinafter from a consideration of the detailed description which follows, taken with the accompanying drawings wherein the invention is illustrated, It is to be understood, however, that the drawings are for the purpose of illustration only and are not intended as a definition of the limits or scope of the invention.

BRIEF DESCRIPTION OF THE DRAWINGS

FIG. 4 is an exploded view of the several parts of the hybrid roller skate or transporter dolly prior to final assembly when unpacked for subsequent use as shown in FIGS. 1, 2 and 3.

DETAILED DESCRIPTION OF THE DRAWINGS

Figure 1:
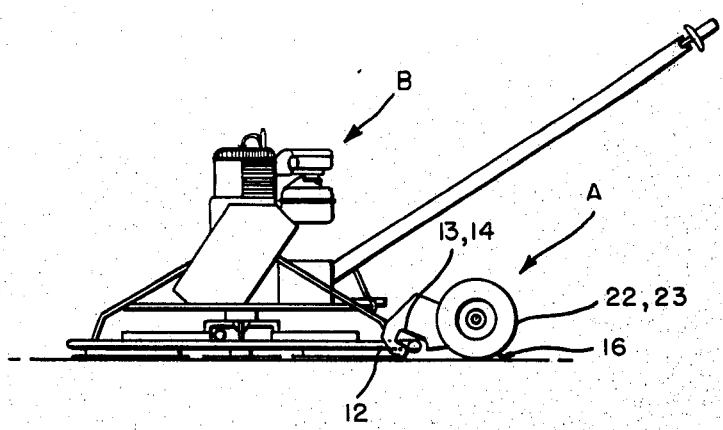
FIG. 1 is a side elevational view of a smoothing or sanding machine with the forward spaced carrier hook portion of the dolly of the present invention placed over a base part of the machine.
Figure 2:
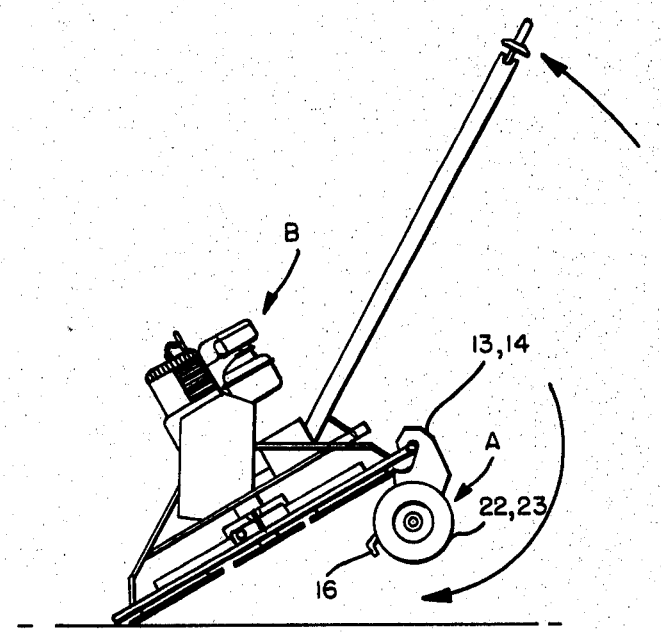
FIG. 2 is a side elevational view of the sanding machine tilted forward swinging the dolly under the machine to position the dolly in its proper transporting position.
Figure 3:
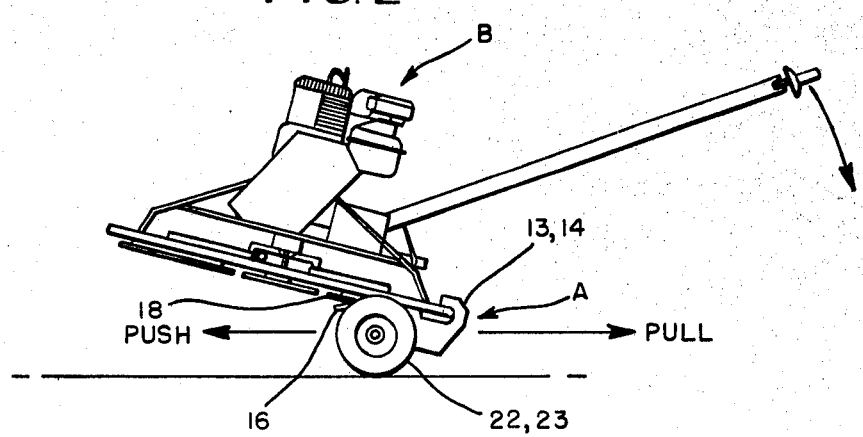
FIG. 3 is a side elevational view of the machine and dolly showing the completed connection between the dolly and machine with the machine tilted back to allow the movement of the machine, dolly combination.

Referring in detail to the invention, and first with respect to transport roller skate device or wheeled transport dolly A as it is illustrated, for use with a surface treatment machine such as a trowel or smoother B in FIGS. 1, 2 and 3, the transport roller skate dolly A is shown in a sequence of views illustrating its mounting onto the surface treatment machine B. In FIG. 1, the roller skate device or wheeled transport dolly A is shown with a pair of downwardly curved spaced carrier connecting hooks 13, 14 placed over a raised base flange or ring 12 of the surface treatment machine B.

FIG. 2 shows the surface treatment machine B tilted forward from its resting position to allow the roller skate device or wheeled transport dolly A to swing under the machine. At this point, the roller skate device or wheeled transport dolly A hangs from the raised base flange or ring 12 of the surface treatment machine B by the downwardly curved, spaced carrier connecting hooks 13 and 14. After the roller skate device or wheeled transport dolly A is freely hanging from the surface treatment machine B, the surface treatment machine may be lowered until the machine rests on the roller skate or dolly A. The point of contact between the raised base flange or ring 12 of the surface treatment machine B and the downwardly curved spaced carrier connecting hooks 13, 14 act as a first point of support for the surface treatment machine B. A second point of support is provided by a machine support spacer 16. When the surface treatment machine B is lowered onto the roller skate device or dolly A, the weight of the machine B securely affixes the machine to the transport dolly A.

FIG. 3 shows the surface treatment machine B properly mounted on the roller skate device or wheeled transport dolly A for easy movement. The surface treatment machine B is supported by the dolly A through the locking action of the downwardly curved spaced carrier connecting hooks 13, 14 on the raised base flange or ring 12 of the trowel B, and the secondary support of the machine support spacer 16 which on the trowel machine B of FIGS. 1 through 3, supports the machine by its support of a machine blade 18.

FIG. 4 provides a greater detail of the structural elements of the hybrid roller skate or transport dolly A. The dolly A comprises a support axle 18, upon which the downwardly curved spaced carrier connecting hooks 13, 14 are spaced apart, and securely fastened. The downwardly curved spaced carrier connecting hooks 13, 14 may be fastened to the support axle 18 in any desirable manner, for example, by welding or bolting. The machine support spacer 16 is fastened to the support axle 18 at a point midway between the downwardly curved spaced carrier connecting hooks 13, 14. Again, the machine support spacer 16 may be fastened to the support axle 18 in any desired manner.

The ends of the support axle 18 extend through the downwardly curved spaced carrier connecting hooks 13, 14 to form a pair of stub axles 19, 20. A pair of wheels or rollers 22, 23 are fastened to the stub axles 19, 20 in any desired manner, for example, through the use of a pair of washers 24, 25 and a pair of cotter pins 26, 27.

When fastened together, the parts illustrated in FIG. 4 form the hybrid roller skate or transport dolly A of the present invention. An important aspect of the assembled dolly or roller skate device A of the present invention is the location of the dolly's centroid or center of mass. The downwardly curved, spaced carrier connecting hooks, 13, 14 are shaped so as to locate the centroid of the assembled dolly so that when the assembled dolly is swinging from under the surface treatment machine B, as shown in FIG. 2, the dolly rollers 22, 23 are actually located under the machine. Thus, because of the location of the centroid or center of mass of the dolly A, the dolly A rolls under the surface treatment machine B positioning itself upon lowering of the machine, thus to properly support the surface treatment machine B.

From the foregoing discussion, it may be readily understood how the arrangement of the above elements of the hybrid roller skate transport dolly A are associated together for use with the equipment B. While only one arrangement of the present invention is illustrated, it is to be expressly understood that the same is not limited to only one arrangement as various arrangements may be made in the design, as would occur to one of ordinary skill in the art.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A portable hybrid roller skate device for use in transporting a relatively large and heavy surface treating machine having a base rim across a surface, said device comprising:

a body;

pivot hook means integral with said body for hooking over and pivoting about the base rim of said surface treating machine;

said roller skate device having a centroid located so that when the base rim of said surface treating machine nearest said pivot hook means is lifted from a resting position on said surface, said roller skate pivots about said base rim and swings under said surface treating machine to remain under said machine when said machine is returned to a resting position to support at least a portion of said machine; and roller means mounted on said body for contacting said surface when said roller skate device supports said machine, said roller means allowing the device to be easily transported.

2. The roller skate device of claim 1 wherein said base rim of said machine conforms to the shape of said hook means to operatively interact therewith.

3. The roller skate device of claim 2 wherein said base rim of said machine is a guard ring;

said hook means comprising first and second spaced, downwardly opening hooks which are placed over said guard ring to operatively interact therewith.

4. The roller skate device of claim 2 wherein said machine includes a handle;

said machine being transported on said roller means in a manner similar to a two wheeled dolly.

* * * * *